(12) United States Patent
Kis

(10) Patent No.: US 11,420,298 B2
(45) Date of Patent: Aug. 23, 2022

(54) METHOD OF MAKING A HEAT EXCHANGER

(71) Applicant: Modine Manufacturing Company, Racine, WI (US)

(72) Inventor: Michael J. Kis, Burlington, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 17/411,712

(22) Filed: Aug. 25, 2021

(65) Prior Publication Data

US 2022/0063029 A1 Mar. 3, 2022

Related U.S. Application Data

(60) Provisional application No. 63/070,569, filed on Aug. 26, 2020.

(51) Int. Cl.
*B23P 15/26* (2006.01)
*F28F 9/02* (2006.01)

(52) U.S. Cl.
CPC ............... *B23P 15/26* (2013.01); *F28F 9/02* (2013.01); *Y10T 29/49389* (2015.01)

(58) Field of Classification Search
CPC ....... B23P 15/26; Y10T 29/49389; F28F 9/04; F28F 9/16; F28F 9/162; F28F 9/165; F28F 9/18; F28F 9/182; F28F 9/185; F28F 9/187
See application file for complete search history.

(56) References Cited

U.S. PATENT DOCUMENTS

| | | | |
|---|---|---|---|
| 1,320,652 A * | 11/1919 | Sonneborn | B23P 15/26 122/DIG. 16 |
| 2,164,628 A | 7/1939 | Sibley | |
| 2,488,627 A * | 11/1949 | Hisey | F28F 9/18 165/DIG. 493 |
| 3,181,440 A | 5/1965 | Mullaney et al. | |
| 3,245,465 A * | 4/1966 | Young | F28F 1/32 29/890.047 |

(Continued)

FOREIGN PATENT DOCUMENTS

JP 2008089257 A 4/2008

OTHER PUBLICATIONS

International Search Report with Written Opinion for related Application No. PCT/US2021/047530 dated Dec. 8, 2021 (17 Pages).

*Primary Examiner* — Jason L Vaughan
(74) *Attorney, Agent, or Firm* — Michael Best & Friedrich LLP

(57) ABSTRACT

A method of making a heat exchanger that includes sealing tubes to header slots and brazing the tubes to the header slots. The method further includes coupling a cover to the header to cover a liquid-side surface of the header and to cover ends of the tubes, and applying flux to an air-side surface of the header and to the tubes. Coupling the cover to the header is performed after sealing the tubes to the header slots and coupling the cover to the header is performed before applying flux to the air-side surface of the header and to the tubes. Applying flux is performed before brazing each of the tubes to the header slots and sealing each of the tubes to the header slot includes sealing a perimeter of each of the tubes to the header slot.

20 Claims, 4 Drawing Sheets

(56) References Cited

U.S. PATENT DOCUMENTS

| | | | | |
|---|---|---|---|---|
| 4,234,041 | A | * | 11/1980 | Melnyk ............... F28F 9/02 |
| | | | | 165/173 |
| 4,377,024 | A | | 3/1983 | Saperstein |
| 4,529,034 | A | * | 7/1985 | Saperstein ......... B23K 1/0012 |
| | | | | 165/173 |
| 4,730,669 | A | * | 3/1988 | Beasley ............... F28F 9/182 |
| | | | | 165/173 |
| 4,744,505 | A | * | 5/1988 | Calleson ............. B21D 39/06 |
| | | | | 228/183 |
| 4,813,112 | A | * | 3/1989 | Pilliez ................ F28F 9/185 |
| | | | | 29/515 |
| 4,858,686 | A | * | 8/1989 | Calleson ............. B21D 39/06 |
| | | | | 165/173 |
| 5,036,913 | A | * | 8/1991 | Murphy .............. B23K 31/02 |
| | | | | 228/183 |
| 5,150,520 | A | * | 9/1992 | DeRisi ................. F28F 9/182 |
| | | | | 228/183 |
| 5,178,211 | A | * | 1/1993 | Bauer ................ F28F 9/0209 |
| | | | | 165/173 |
| 5,366,006 | A | * | 11/1994 | Lu ....................... F28F 9/162 |
| | | | | 165/173 |
| 5,407,004 | A | | 4/1995 | Derisi et al. |
| RE35,098 | E | * | 11/1995 | Saperstein ......... B23K 9/0288 |
| | | | | 228/183 |
| 8,181,694 | B2 | * | 5/2012 | Powers ............... F28F 9/0226 |
| | | | | 165/149 |
| 9,630,281 | B2 | | 4/2017 | Connor |
| 2002/0108244 | A1 | | 8/2002 | Appert et al. |
| 2007/0138237 | A1 | | 6/2007 | Nishikawa et al. |
| 2008/0053646 | A1 | | 3/2008 | Martin et al. |

* cited by examiner

METHOD OF MAKING A HEAT EXCHANGER

CROSS-REFERENCE TO RELATED APPLICATIONS

This application claims priority to U.S. Provisional Patent Application No. 63/070,569, filed Aug. 26, 2020, the entire contents of which are hereby incorporated by reference herein.

FIELD OF THE INVENTION

The present invention relates to heat exchangers and to a method of making heat exchangers.

BACKGROUND OF THE INVENTION

Heat exchangers include components like tubes, headers, and fins that are joined together in a brazing process. Flux is commonly applied to the heat exchanger components prior to the brazing process to ensure a high quality, brazed joints between the heat exchanger components. The fluxing process commonly includes dipping an assembled heat exchanger into a flux composition or spraying the flux composition around the assembly heat exchanger. The fluxing process can be messy, and, it may be undesirable to have a significant amount of flux remaining in areas of the heat exchanger. Often, the heat exchanger assembly is cleaned at or near the end of the production of the heat exchanger to at least partially remove flux.

SUMMARY OF THE INVENTION

The present invention provides, in one aspect, a method of making a heat exchanger. The method comprises arranging a plurality of tubes in a formation, coupling the plurality of tubes to a header, including sealing each of the tubes of the plurality of tubes to a header slot of a plurality of header slots in the header and brazing each of the tubes of the plurality of tubes to said header slot of the plurality of header slots, coupling a cover to the header to cover a liquid-side surface of the header and to cover ends of the tubes, and applying flux to an air-side surface of the header and to the plurality of tubes, wherein coupling the cover to the header is performed after sealing each of the tubes of the plurality of tubes to said header slot of the plurality of header slots, wherein coupling the cover to the header is performed before applying flux to the air-side surface of the header and to the plurality of tubes, wherein applying flux is performed before brazing each of the tubes of the plurality of tubes to said header slot of the plurality of header slots, and wherein sealing each of the tubes of the plurality of tubes to said header slot includes sealing a perimeter of each of the tubes to said header slot.

In some embodiments, the tank is coupled to the header via crimping.

In some embodiments, the step of coupling ends of each of the plurality of tubes to a liquid-side surface of the header includes welding each of the plurality of tubes to the liquid-side surface of the header.

In some embodiments, the method further comprises a step of placing a header onto the plurality of tubes after arranging the plurality of tubes in a formation.

In some embodiments, the step of coupling the cover to the header to cover the liquid-side surface and the ends of the tubes is performed prior to the step of applying flux to the plurality of tubes adjacent the air-side surface of the header and to the header.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
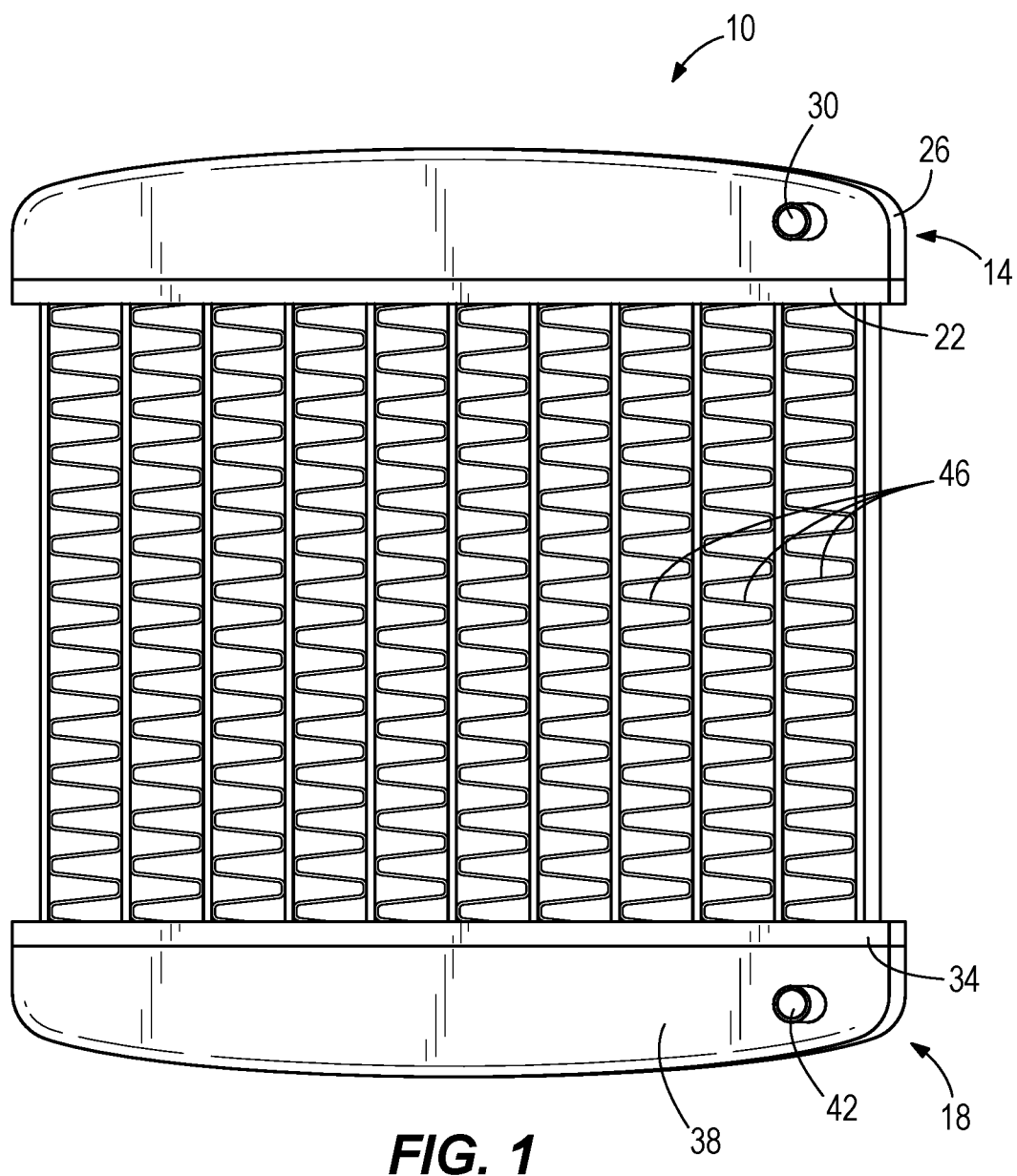
FIG. 1 is a front view of a heat exchanger.
Figure 3:
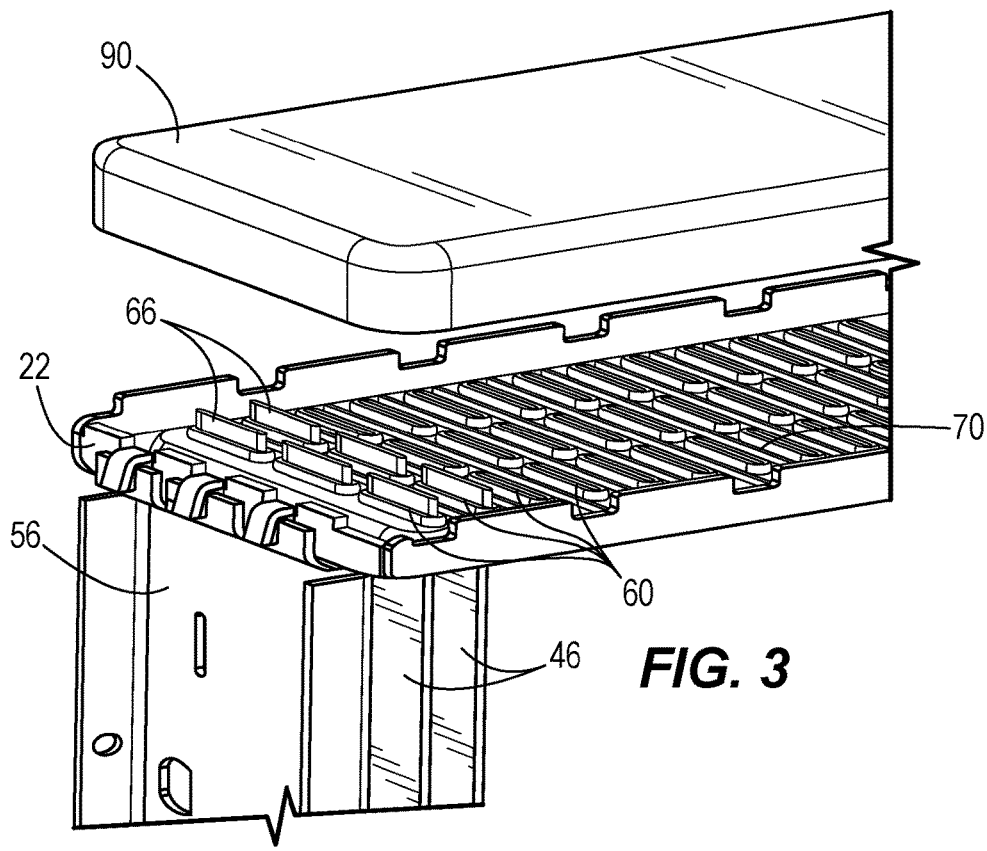
FIG. 3 is a partial perspective exploded view of the heat exchanger of FIG. 1.

FIG. 1 illustrates a heat exchanger 10 including a first collection tank assembly 14 and a second collection tank assembly 18. The first collection tank assembly 14 includes a header 22 and a collection tank 26 with an inlet 30. The second collection tank assembly 18 includes a header 34 and a collection tank 38 with an outlet 42. In some embodiments, each of the headers 22, 34 are aluminum with braze cladding on one or two sides thereof. In some embodiments, the collection tanks 26, 38 are formed of plastic and in such embodiments, gaskets are respectively arranged between the collection tanks 26, 38 and their respective headers 22, 34. In some embodiments, the collection tanks 26, 38 are made from aluminum and brazed to the headers 22, 34. A plurality of tubes 46 fluidly couple the first and second collection tank assemblies 14, 18 and are coupled to the headers 22, 34 of the first and second collection tank assemblies 14, 18. In some embodiments, the tubes 46 are formed of aluminum with braze cladding on one or two sides. In some embodiments, the tubes 46 are welded, but in other embodiments, could be folded. In some embodiments, the tubes 46 have cladding on both sides of the tubes. Fins 47 are disposed between tubes 46, and the fins 47 are formed of aluminum with no cladding. Side plates 56, as shown in FIG. 3, are located at ends of the heat exchanger 10. The side plates 56 are formed from aluminum with cladding on one or both sides of the side plates 56. The side plates 56 are each joined to one of the fins 47.

In operation of the heat exchanger 10, a liquid (e.g. water and/or coolant) flows into the inlet 30 of the collection tank 26 at a relatively high temperature, and then flows through the tubes 46 to the collection tank 38, before flowing out the outlet 42. While flowing through the tubes 46, the liquid is cooled, as heat escapes the liquid via the tubes 46, which are typically cooled by airflow. In some embodiments, the heat exchanger is used to coolant for fuel cell cooling, and in such instances, the coolant is required to have less impurities, such as flux residues.

Figure 2:
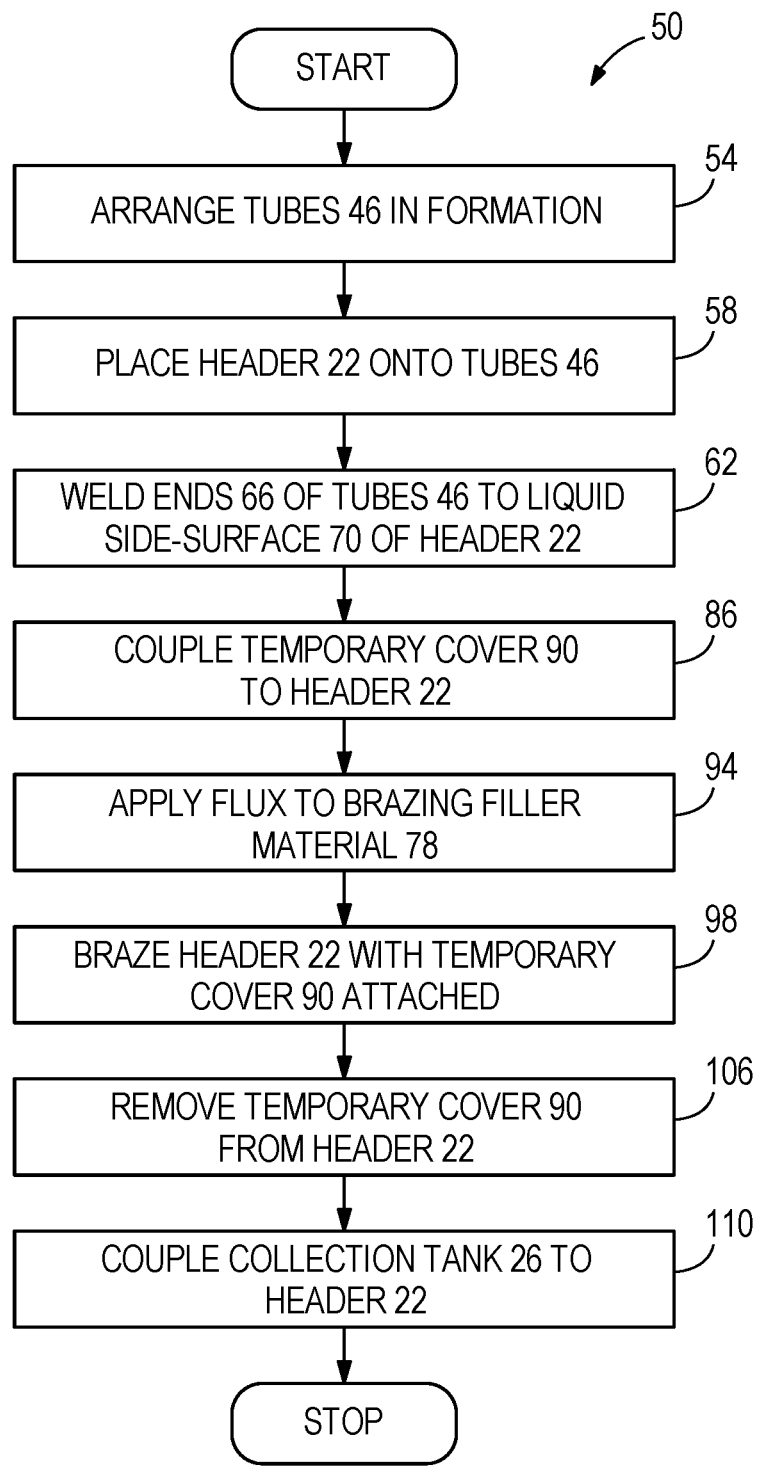
FIG. 2 is a flowchart illustrating assembly of the heat exchanger of FIG. 1.

FIG. 2 illustrates a method 50 of making the heat exchanger 10, or at least the first collection tank assembly 14 and/or the second collection tank assembly 18 of the heat exchanger 10. For simplicity of description, the following explanation will just cover the making of the first collection tank assembly 14. First, as shown at step 54, the tubes 46 arranged in an array, stack, or formation in which they will be coupled to the header 22. During step 54, the side plate 56 is on the bottom of the stack and an opposite side plate 56 is on the top of the stack. One of the fins 47 is next to each of the side plates 56. The stack is completed by alternating fins and tubes 46.

Figure 4:
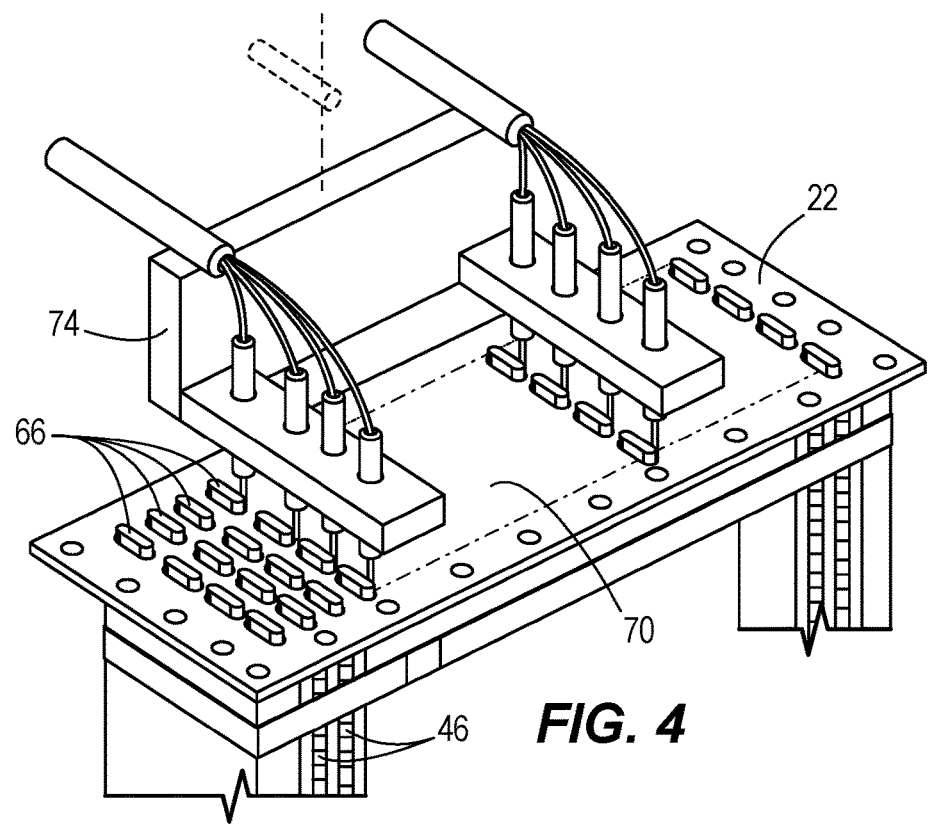
FIG. 4 is a perspective view of tubes being welded to a header of the heat exchanger of FIG. 1.
Figure 5:
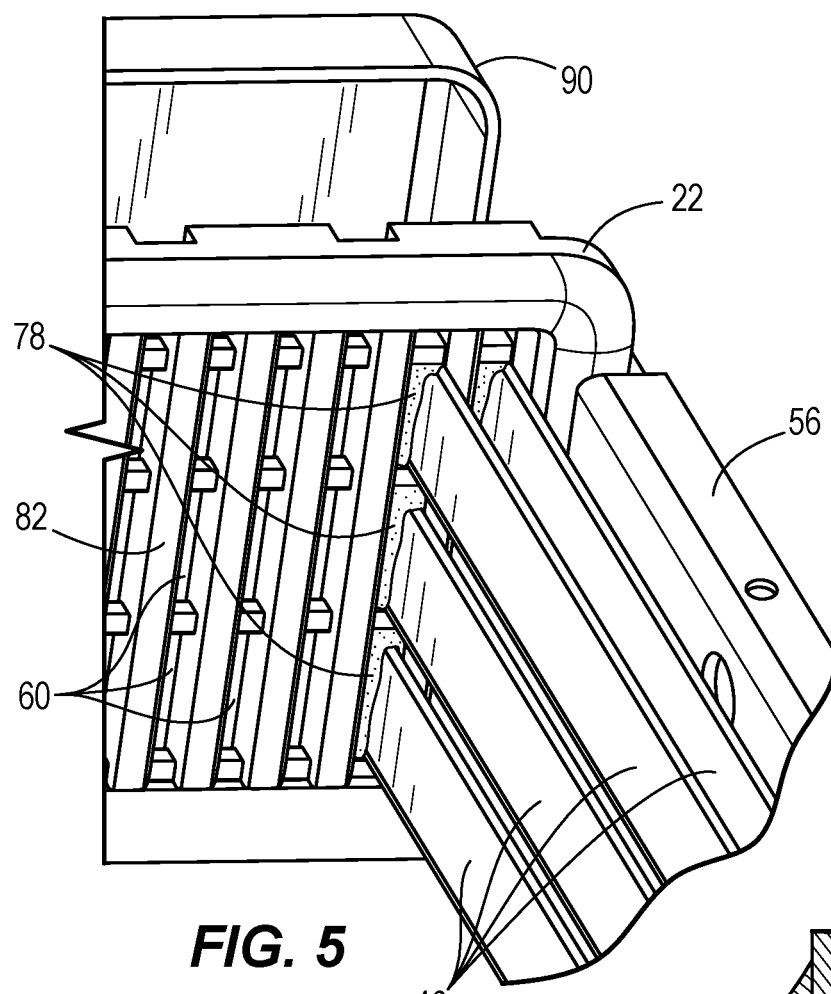
FIG. 5 is a partial exploded view of the heat exchanger of FIG. 1.

At step 58 and as shown in FIG. 3, the header 22 is placed onto the tubes 46 by inserting the tubes 46 through slots 60 in the header 22. At step 62, ends 66 of the tubes 46 are welded to the header 22 on a liquid-side surface 70 (FIG. 3), thereby blocking flux from penetrating the header 22 to contact the liquid-side surface 70 or the ends 66 of the tubes 46. FIG. 4 illustrates an example process of welding the tubes 46 to the header 22, using a multi-torch welder 74. No braze filler or back solder is applied between the tubes 46 and the respective headers 22, 34, as the engaged surfaces are clad with braze material that ultimately melts to join the tubes 46 to the respective headers 22, 34. The slots 60 have collars that extend to the inside of the header 22. These collars have a thinner wall than the nominal thickness of the header 22, being thinned as they are formed. In some embodiments, the collars are formed such that they are thinner than the nominal thickness of the material forming the header 22. Ideally, the thickness of the collar material would equal the thickness of the tube material. The collar extends in a direction towards the interior of the header 22.

During step 62, the production line includes a welder on one side of the production line, which could be a torch welder as shown in FIG. 4, or could be other types of conventional welders. The production line could include welders are both sides of the production line. As the header 22 and tubes 46 stops at the welder location, the welder welds the tubes 46 to the header 22. For a production line with a welder on just one side, the header 22 must be rotated to weld tubes 46 to the header 22 on the opposite side. For a production line with welders on both sides, the tubes 46 can be welded to the headers 22 on both sides of the header 22 at the same time. The geometry of the slot 60 in the header 22 helps to create the weld between the tube 46 and the header 22. The insertion distance of the tubes 46 into the header 22 is such that the ends of the tubes 46 extend through the header 22 and beyond the edges of the collars. The welding process melts both the ends of the tubes 46 and part of the collars to create a weld bead completely around the tube slot 60, sealing the tubes 46 to the tube slots 60.

In some embodiments, the welder includes a torch head, which can move along in predetermined pattern, and the torch head includes a plurality of torches. The pattern is programmed such that at least one torch moves around the perimeter of each tube 46 or collar during welding of the tube 46 to the collar. The torch may also follow a pattern that crosses a nose area (the narrow end of the tube) of the tube 46 at least one time in each nose area of the tube 46 and, ideally, multiple times. The weld pattern at the nose areas may look like an "X". The purpose of the weld at step 62 is to completely seal the tube 46 to the header 22 around the tube slot 60. The weld bead will be located either flush with the inside of the header 22 to 2-3 mm from the inside wall of the header 22.

At step 86, a temporary cover 90 is coupled over the header 22, thereby covering the liquid-side surface 70 and the ends 66 of the tubes 46 welded to the header 22. During step 86, the temporary cover 90 extends completely over the header 22, around the perimeter of the header 22, and overlaps the side walls of the header 22 on the outside of the side walls. In some embodiments, the temporary cover 90 fits inside of the header 22, completely covering the inside of the header 22 and the ends 66 of the tubes 46, and overlaps the side walls of the header on the inside of the side walls. In another embodiment, instead of the temporary cover 90, the collection tank 26 is brazed to the header 22 during the brazing operation. The temporary cover 90 can be made from plastic or metal. The temporary cover 90 can be fastened to the header by an interference fit, snap-on fit, clamps, straps, or a mechanical fixture having a geometry that engages with both the header 22 and the temporary cover 90.

At step 94, flux is applied to the tubes 46, fins 47, side plates 56, and the surfaces of the header 22 that face the tubes 46. The flux removes oxidation on these surfaces during a subsequent brazing process, thus preventing corrosion and promoting the free flow brazing material from the braze cladding. Because the temporary cover 90 covers the liquid-side surface 70 and the ends 66 of the tubes 46 are welded to the header 22 prior to the application of flux at step 94, contamination of the tube, which can sometimes occur during application of flux, is inhibited. Thus, subsequent contamination of the liquid, such as fuel cell coolant, when passing through the tubes 46, is inhibited. In some embodiments, the temporary cover 90 is removed from the header 22 after fluxing and before brazing, particularly when the temporary cover 90 is formed from a plastic material.

Figure 6:
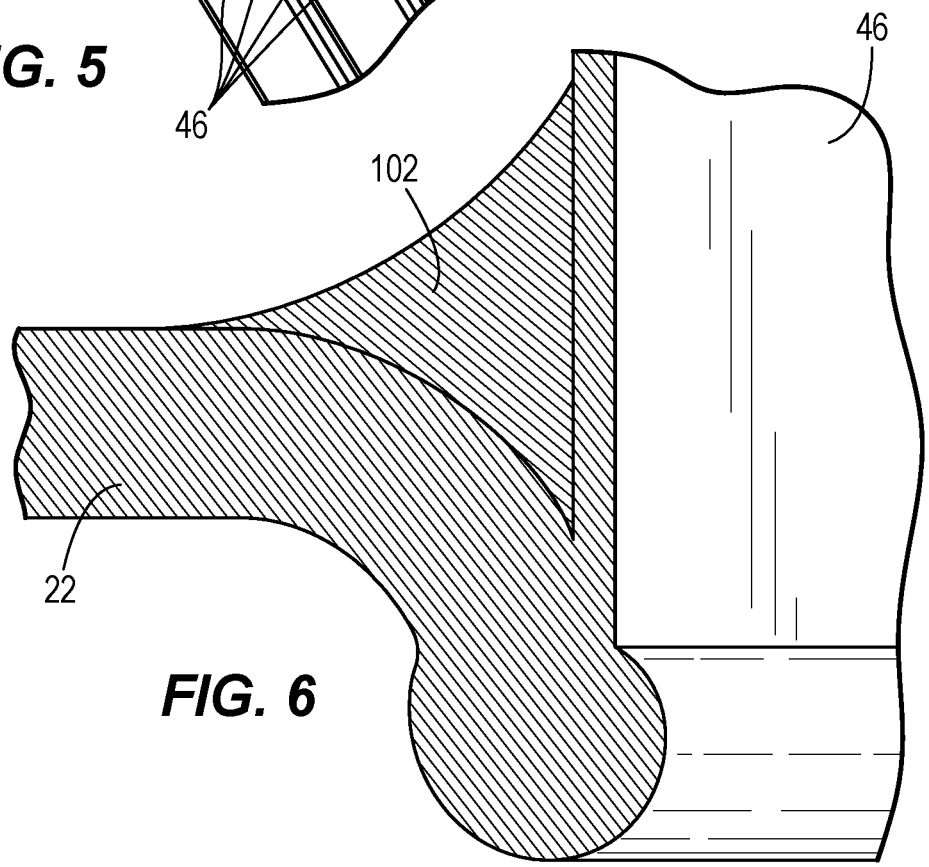
FIG. 6 is an enlarged cross-sectional view of the heat exchanger of FIG. 1.

At step 98, the header 22 goes through a brazing process while the temporary cover 90 remains on the header 22. During step 98, the brazing material of the braze cladding melts to join the tubes 46 to the header 22 at the air-side surface 82, thereby forming a braze fillet 102 (FIG. 6) at the air-side surface 82, which further strengthens the joints between the tubes 46 and the header 22. In some embodiments, the heat exchanger 10 is moved into the brazing furnace, which is for a Controlled Atmosphere Brazing (CAB) process. In the brazing process, the clad materials melt from the heat of the furnace, and the base materials of the components do not melt. The clad materials flow to joint areas between components. The joint areas are where the tubes 46 meets the header 22 at the air-side surface of the header 22, where the tubes 46 meet the fins 47, and where the fins 47 meet the side plates 56. As the heat exchanger assembly 10 is removed from the furnace, the clad material cools and forms joints in these areas. In some embodiments, the collection tank 26 is brazed to the header 22 to form heat exchanger tanks. In some embodiments, unwanted debris will be brazed to the inside cladding of the tube 46 (for tubes 46 with cladding on both sides—the inside clad for removing debris) during the brazing process to provide a cleaner tube volumes.

At step 106, the temporary cover 90 is removed from the header 22. At step 110, to replace the temporary cover 90, the collection tank 26 is coupled to the header 22 via, e.g., crimping. In some embodiments, the collection tank 26 is stainless steel and is snapped onto the header 22. When the collection tank 26 is coupled to the header 22, a gasket is arranged between the collection tank 26 and the header 22.

In an alternative embodiment, the collection tank 26 is coupled to the header 22 at step 86, instead of the temporary cover 90. In this alternative embodiment, the collection tank 26 remains on during step 94, thereby inhibiting contamination of the tubes 46. Also in this alternative embodiment, the collection tank 26 is removed prior to step 98, such that the collection tank 26 (which can be formed of plastic) does not melt during the brazing process. After the brazing process at step 98, the collection tank 26 would then be recoupled to the header 22.

In some embodiments, the heat exchanger 10 is part of a fuel cell and the liquid is fuel cell coolant. In some embodiments, instead of welding the ends 66 of the tubes 46 to the liquid-side surface 70 of the header 22, the slots 60 in the header 22 are packed with a sealant, which prevents the flux from entering the header 22 and contacting the liquid-side surface 70. The sealant then dissolves in the brazing process. In some embodiments, the collection tanks 26, 38 are aluminum with cladding on one or two sides, and the collection tanks 26, 38 are brazed to the headers 22, 34 during the brazing step 98 of the method 50.

Although the invention has been described in detail with reference to certain preferred embodiments, variations and modifications exist within the scope and spirit of one or more independent aspects of the invention as described.

What is claimed is:

1. A method of making a heat exchanger, the method comprising:
    arranging a plurality of tubes in a formation;
    coupling the plurality of tubes to a header, including
        sealing each of the tubes of the plurality of tubes to a header slot of a plurality of header slots in the header and brazing each of the tubes of the plurality of tubes to said header slot of the plurality of header slots;
    coupling a cover to the header to cover a liquid-side surface of the header and to cover ends of the tubes; and
    applying flux to an air-side surface of the header and to the plurality of tubes,
    wherein coupling the cover to the header is performed after sealing each of the tubes of the plurality of tubes to said header slot of the plurality of header slots,
    wherein coupling the cover to the header is performed before applying flux to the air-side surface of the header and to the plurality of tubes,
    wherein applying flux is performed before brazing each of the tubes of the plurality of tubes to said header slot of the plurality of header slots, and
    wherein sealing each of the tubes of the plurality of tubes to said header slot includes sealing a perimeter of each of the tubes to said header slot.

2. The method of claim 1, wherein sealing each of the tubes of the plurality of tubes to said header slot, includes welding the perimeter of each of the tubes to said header slot of the plurality of headers slots at the liquid-side surface of the header.

3. The method of claim 2, wherein the welding step includes melting ends of the tubes and melting flanges of the header slots to form a weld bead around the perimeter of each of the tubes.

4. The method of claim 1, wherein sealing each of the tubes of the plurality of tubes to said header slot, includes packing a sealant around the perimeter of each of the tubes and between each of the tubes and said header slot of the plurality of headers slots.

5. The method of claim 1, further including forming header slots into the header by forming a flange around each of the header slots, wherein the flange extends from the liquid-side surface of the header.

6. The method of claim 5, further including forming an edge of the flange to a have an edge thickness, wherein the edge thickness is less than a header thickness and greater than or equal to a tube thickness.

7. The method of claim 6, wherein the edge thickness is formed to equal to the tube thickness.

8. The method of claim 5, wherein the tubes are inserted into the header slots such that the ends of the tubes extend beyond edges of the flanges.

9. The method of claim 5, wherein the tubes are inserted into the header slots such that the ends of the tubes are parallel to the edges of the flanges.

10. The method of claim 1 further including, wherein the cover is removed after the step of brazing each of the tubes of the plurality of tubes to said header slot of the plurality of header slots.

11. The method of claim 10 further including, wherein a tank is assembled to the header after the cover is removed.

12. The method of claim 11 further including, assembling a gasket onto the liquid-side of the header before assembling the tank to the header.

13. The method of claim 1 further including, wherein the cover is removed after the step of applying flux to the air-side surface of the header and to the plurality of tubes.

14. The method of claim 13, wherein the cover is removed before the step of brazing each of the tubes of the plurality of tubes to said header slot of the plurality of header slots.

15. The method of claim 13 further including, wherein a tank is assembled to the header after the cover is removed.

16. The method of claim 15 further including, assembling a gasket onto the liquid-side of the header before assembling the tank to the header.

17. The method of claim 1 further including, overlapping with the cover at least a portion of a perimeter of the header.

18. The method of claim 17 further including, removably clamping the cover to the header.

19. The method of claim 17 further including, removably clamping the cover to at least one of the side plates.

20. The method of claim 1 further including, welding the cover to the header.

* * * * *